J. L. DAY.
VEHICLE WHEEL.
APPLICATION FILED APR. 20, 1909.
960,513.
Patented June 7, 1910.
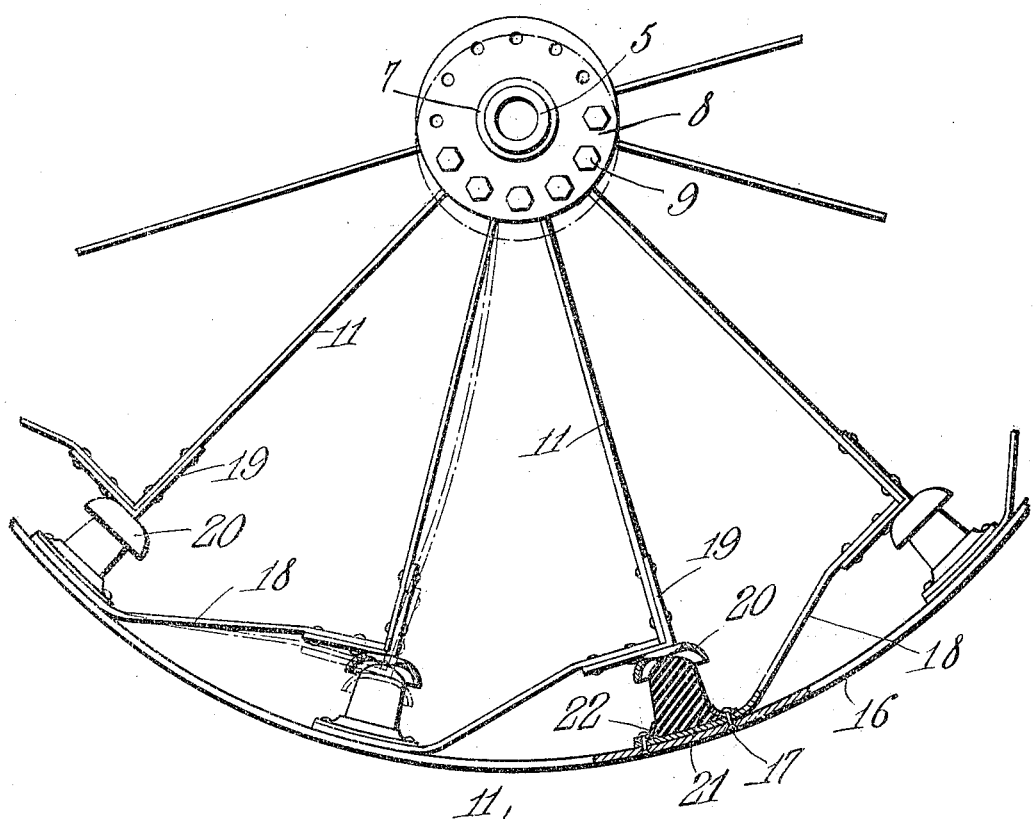
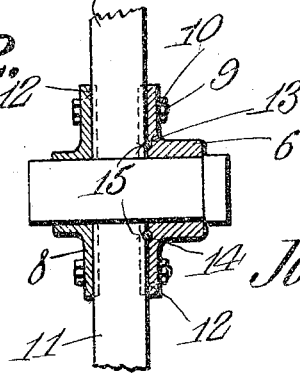
Joseph L. Day
Inventor

UNITED STATES PATENT OFFICE.

JOSEPH L. DAY, OF NASHVILLE, OKLAHOMA.

VEHICLE-WHEEL.

960,513.   Specification of Letters Patent.   Patented June 7, 1910.

Application filed April 20, 1909.   Serial No. 491,001.

*To all whom it may concern:*

Be it known that I, JOSEPH L. DAY, a citizen of the United States, residing at Nashville, in the county of Grant and State of Oklahoma, have invented a new and useful Vehicle-Wheel, of which the following is a specification.

It is the object of the present invention to provide an improved construction of vehicle wheel and more particularly that class which are in themselves resilient and therefore do not necessitate the employment of pneumatic tires, and the invention aims more specifically speaking to provide, in a wheel of this class, means for limiting the yield of the cushioning springs whereby said springs may not be placed under abnormal tension. In this respect, the invention presents advantages over such wheels as are now in use in that while the wheel will be effectually cushioned against shocks, the springs of the wheel are only permitted to yield to a certain degree after which any shock or impact is taken up by buffer members which are yieldable to a less degree than are the springs.

In the accompanying drawings, Figure 1 is a view in elevation and partly in section of a vehicle wheel constructed in accordance with the present invention, one of the spokes of the wheel being shown in dotted lines in abnormal position, and Fig. 2 is a vertical longitudinal sectional view through the wheel hub.

In the drawings, the hub of the wheel is shown as comprising a spindle sleeve 5 upon which are fitted collars 6 and 7, these collars having each a radial flange 8 and being so disposed upon the spindle 5 as to have the inner faces of their flanges 8 in opposed relation, there being bolts 9 passed through the said flanges of the collars and nuts 10 engaged upon the bolts whereby to clamp the collars in the relation stated.

The spokes of the wheel embodying the present invention are shown as of resilient bar metal and are indicated by the numeral 11 and the inner ends of these spokes are received in radial grooves 12 formed in the opposed faces of the collars 6 and 7 upon the spindle sleeve 5 of the hub, the said face of one collar being forced with an annular groove 13 in which is received a locking ring 14 engaging in notches 15 formed in the adjacent edges of the spokes 11 at their inner ends, it being understood that the said spokes are in this manner locked against accidental displacement from the grooves 12 and that they are firmly clamped between the collars 6 and 7 and extend radially from the hub comprised of the spindle sleeve 5 and the said collars.

The rim of the wheel is indicated by the numeral 16 and may be flat or of other contour and may or may not be provided with an elastic tire as desired and secured as at 17 to the inner surface of the rim 16 at equidistant points are spoke extensions 18 which, as in the case of the spokes 11, are of flat resilient bar metal, these extensions being directed inwardly from the rim and each toward the outer end or extremity of one of the spokes 11, the said outer end of each spoke and the corresponding or associated extension 18 being connected through the instrumentality of an angle plate 19 to one wing of which the end of the spoke is secured and to the other end of which the inner extremity of the extension 18 is secured. It will be understood from the foregoing description of this portion of the wheel that upon pressure being exerted upon the rim 16, the ends of the spoke extensions 18 which are connected to the rim 16 will move inwardly to a greater or less degree depending upon the weight or the force of impact and the inner end of each spoke extension 18 will spring outwardly radially as for example as illustrated in dotted lines in Fig. 1 of the drawings, the main portion of the spokes bending also as illustrated in dotted lines in the said figure of the drawings and moving substantially radially from the normal hub center or axis, the hub of course moving downwardly to a greater or less degree.

It will be understood from the above that weight upon the wheel and the force of impact had thereby against any object or against inequalities in the road surface will be absorbed by springs 18, but in case such impact be quite severe in degree it is desirable to provide some means for limiting the yield of the springs whereby the springs may not be subjected to such tension as would render them liable to fracture and this means is preferably embodied in buffer members carried one by each spoke and the others by the rim of the wheel. The member which is carried by the spokes is in the nature of a metallic cap 20 which is secured to the angle plate 19 at the angle thereof but to that wing of the said plate to which the inner end of the spoke extension 18 is connected, this cap member being concavo-convex in form with its concavity presented toward the rim of the wheel. The other buffer member of the wheel is in the form of a conoidal rubber block 21 secured, by means of an annulus 22, upon the inner side of the rim 16 one directly outwardly radially beyond the outer end of each spoke 11 and as will be readily understood, these conoidal buffer blocks are presented directly toward the respective cap or socket members 20 and as a matter of fact are received at their ends partly within the said cap members, the exertion of considerable force against the wheel rim opposite any one of these buffers 21 serving to bring the same into engagement with the corresponding cap member 20 whereby to absorb the shock initially counteracted by the resilient spokes and their extensions.

What is claimed is:—

In a vehicle wheel, a hub, a rim, and resilient spokes connecting the hub and rim, each of said spokes comprising a resilient strip secured at its inner end to the hub, a resilient strip secured at one end to the rim and extending at an angle inwardly from the rim and toward the outer end of the first mentioned strip, a two-winged angle-member having one of its wings secured to the said outer end of the first mentioned strip and its other wing secured to the inner end of the second mentioned strip, a cap carried by the last mentioned wing of the angle member and having a concavity presented toward the rim, and an elastic buffer secured upon the rim and adapted to seat in the concavity of said cap.

In testimony that I claim the foregoing as my own, I have hereto affixed my signature in the presence of two witnesses.

JOSEPH L. DAY.

Witnesses:
J. D. LOVE,
G. R. POWELSON.